No. 689,764. Patented Dec. 24, 1901.
J. & W. TITUS.
MECHANISM FOR TRANSMITTING POWER AND MOTION.
(Application filed May 3, 1901.)
(No Model.)
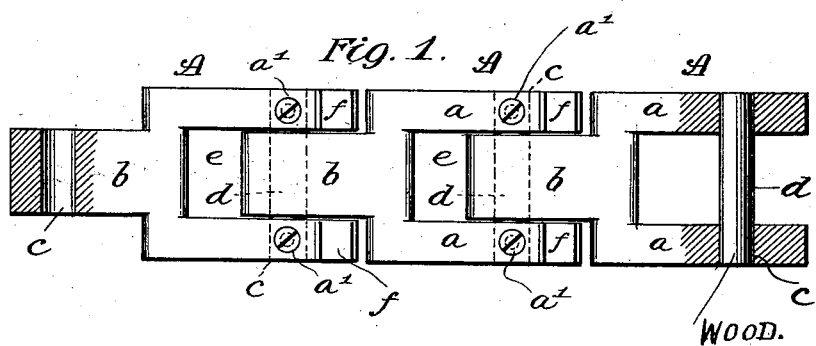
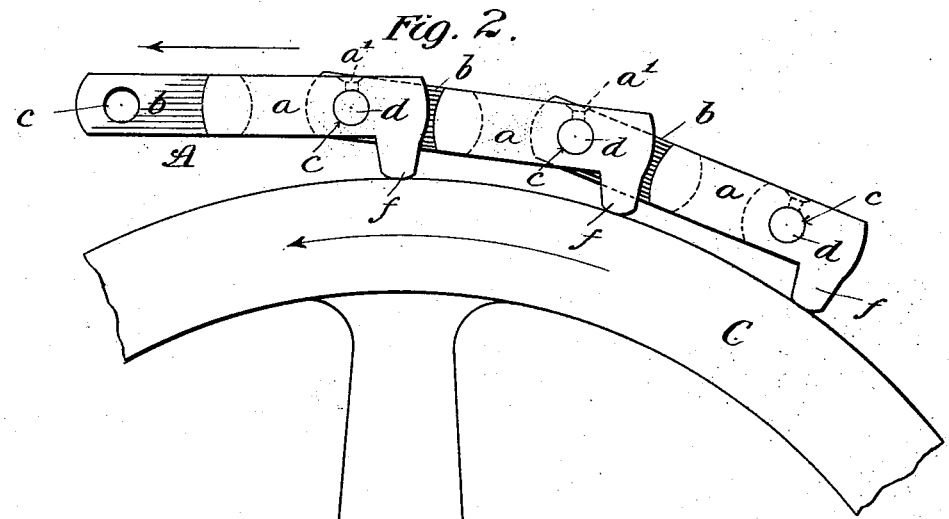
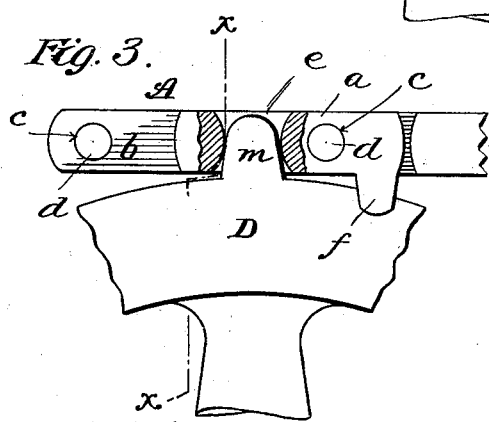
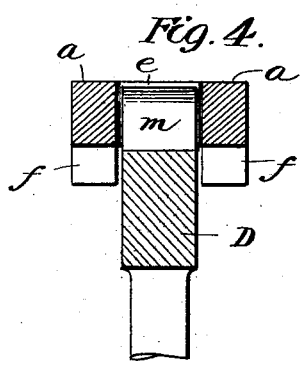
WITNESSES:
Frank A. Ober.
Amaziah Whitney.
INVENTORS
John Titus
William Titus
BY
James A. Whitney
ATTORNEY
THE NORRIS PETERS CO., PHOTO-LITHO., WASHINGTON, D. C.

UNITED STATES PATENT OFFICE.

JOHN TITUS, OF OYSTER BAY, AND WILLIAM TITUS, OF OLD WESTBURY, NEW YORK.

MECHANISM FOR TRANSMITTING POWER AND MOTION.

SPECIFICATION forming part of Letters Patent No. 689,764, dated December 24, 1901.

Application filed May 3, 1901. Serial No. 58,596. (No model.)

*To all whom it may concern:*

Be it known that we, JOHN TITUS, of Oyster Bay, and WILLIAM TITUS, of Old Westbury, in the county of Nassau and State of New York, citizens of the United States, have invented certain new and useful Improvements in Mechanism for Transmitting Power and Motion; and we do hereby declare that the following is a full, clear, and exact description of the same, reference being had to the accompanying drawings, making a part of this specification, in which—

Figure 1 is an under side face view of a sprocket-chain made according to our invention. Fig. 2 is a side view showing a portion of the invention. Fig. 3 is a side view, partly in section, showing another portion thereof. Fig. 4 is a cross-sectional view taken in the line $x$ $x$ of Fig. 3.

This invention relates to chain-and-sprocket mechanisms for transmitting power and motion; and it comprises certain new and useful combinations of parts whereby the friction and consequent loss of power which have heretofore ordinarily been incident to the operation of this class of devices are very materially reduced, with a consequent improvement in the results obtained when applied to use.

A represents the links of a sprocket-chain made according to our invention. Each of these links has a fork $a$ and a shank $b$, which should be integral each with the other. These parts are so shaped and proportioned that the shank of one link fits into the fork of the link behind it, as shown in Fig. 1. Coincident transverse holes $c$ are provided in the fork and shank, respectively, of two adjacent links to receive a transverse pin $d$, which pivots or hinges the one upon the other, so that each link may turn or swing at each end upon the pivot or pin $d$, which connects it with a contiguous link, as indicated in Fig. 2. The holes $c$ should be made of substantial size to permit the use of the pins $d$, (shown in dotted outline in Fig. 1,) which are, when made of any suitable kind of hard and strong wood, capable of receiving a sufficiently smooth polish by friction—such, for example, as ash, maple, hickory, white oak, &c.—as we have discovered that when the sprocket apparatus is used where sand, grit, and the like are liable to enter the pivot and bearings that connect the links with each other pins made of wood, as described, wear much longer and are much less exposed to injury under conditions of rough usage than is the case when pins of metal are employed for like purpose. The pins are to be held in place by suitable means—as, for example, screws tapped into adjacent parts of the links at right angles to the pins and with their ends projected against or into the holes of the pins, as indicated at $a'$ in Fig. 1 and in dotted outline in Fig. 2.

Between the inner end of the shank $b$ of a link A and the end of the fork of the adjoining link, into which the shank is projected and pivoted, as described, is a space $e$, the purpose of which is hereinafter explained.

Upon the outer end of each fork of each link, one upon each prong of said fork, is a spur or lug $f$. The lugs $f$ are shown in side view in Figs. 2, 3, and 4, and in, so to speak, under side view, as shown in Fig. 1, the lugs projecting from the under sides of the end portions of the prongs as distinguished from the lateral edges of the fork, so that said lugs, as hereinafter explained, may ride a smooth pulley which is in line with the sprocket-wheel.

The sprocket-chain, composed of links constructed, arranged, and pivoted together as described, is of the usual endless character. When applied to use, this chain is supported and operated at one end of its fold in a manner herein presently set forth. At the opposite end of the fold it is supported upon a smooth-faced pulley, a section of the face of which is shown in side view at C in Fig. 2. Assuming the chain to be run in the direction of the straight arrow in said figure, the pulley C will run in the direction of the curved arrow in said figure, the legs $f$ coming in contact with the face of the pulley during such movement of the pulley and chain, the links, except the lugs $f$, being kept out of contact with the pulley. By this means the chain is kept out of contact with the pulley except at those intervals along its face or periphery at which the lugs $f$ rest thereon in the passing of the links around the axis of the pulley. As a result of this the friction and waste of power usually incident to the movement of a sprocket-chain around an idler sprocket-wheel are effectually obviated. The opposite end of the fold of the sprocket-chain rests upon a sprocket, a section of which is shown in side view in Fig. 3 and in cross-section in Fig. 4. The teeth m of this sprocket-wheel have a width not as great as the width between the prongs, so to speak, of the forks of the links and a thickness not greater than the length of the space e of each fork behind the shank of the adjacent link inserted therein. The teeth m of the sprocket-wheel are thus enabled to pass into the space e of the chain in a manner similar to that in which the teeth of a sprocket-wheel ordinarily enter the links of a sprocket-chain of ordinary construction. The teeth of the sprocket-wheel being not as wide as the spaces between the two lugs of each link, the lugs pass freely and are then enabled to ride upon the smooth-faced pulley C, as hereinbefore explained, without interfering with or being interfered with by the operation of the sprocket-wheel in actuating the chain by the action of the teeth in the spaces e of the links.

What we claim as our invention is—

1. A sprocket-chain composed of links each of which has a forked portion with lugs projected downward from the outer end portions of the prongs of the fork, and a shank extended from its opposite end, the shank of one link being fitted into, and pivoted to, the fork of an adjacent link and the lugs arranged to run upon a smooth-faced pulley while the teeth of a sprocket-wheel pass between them at the opposite fold of the belt, as described.

2. The combination with a sprocket-chain composed of links each of which has a forked portion with lugs projected from the under sides of the outer ends of the prongs of said forked portion and a shank extended from its opposite end and fitted into, and pivoted to the fork of an adjacent link with a space, e, between the end of the shank and the inner end of the fork, of a smooth-faced pulley for receiving the impact of the lugs at one end of the fold of the chain, and a sprocket-wheel arranged to gear into the spaces, e, of the chain at the opposite end fold thereof, with its teeth passing between the said lugs, as described.

3. The combination with sprocket-links each of which has a forked portion projected from one end and a shank extended from its opposite end into the fork of an adjacent link of like construction of transverse pins of wood which pivot the shank of the one link to the fork of the other as described whereby the wear and friction incident to the action of sand, grit, &c., upon metal connections are prevented, as set forth.

JOHN TITUS.
WILLIAM TITUS.

Witnesses:
H. G. HAYWARD,
E. LUDLAM.